United States Patent
Yokouchi

(10) Patent No.: US 6,801,712 B1
(45) Date of Patent: Oct. 5, 2004

(54) RECORDING APPARATUS WITH JUMP DESTINATION POSITION INFORMATION

(75) Inventor: Kentaro Yokouchi, Yokohama (JP)

(73) Assignee: Victor Company of Japan, Ltd., Yokohama (JP)

( * ) Notice: Subject to any disclaimer, the term of this patent is extended or adjusted under 35 U.S.C. 154(b) by 0 days.

(21) Appl. No.: 09/553,023

(22) Filed: Apr. 20, 2000

(30) Foreign Application Priority Data

Jun. 16, 1999 (JP) .......................................... 11-169730

(51) Int. Cl.[7] ................................................ H04N 5/91
(52) U.S. Cl. .......................................... 386/69; 386/70
(58) Field of Search ........................... 386/6–8, 33, 45, 386/68–70, 81–82, 125–126

(56) References Cited

U.S. PATENT DOCUMENTS

| | | | | |
|---|---|---|---|---|
| 5,587,806 A | * | 12/1996 | Yamada et al. | 386/68 |
| 5,621,840 A | * | 4/1997 | Kawamura et al. | 386/68 |
| 5,647,048 A | * | 7/1997 | Ting et al. | 386/68 |
| 5,719,982 A | * | 2/1998 | Kawamura et al. | 386/65 |
| 5,754,728 A | * | 5/1998 | Nakajima et al. | 386/68 |
| 5,838,872 A | * | 11/1998 | Kawara | 386/68 |
| 6,118,928 A | * | 9/2000 | Kawakami et al. | 386/109 |
| 6,728,469 B1 | * | 4/2004 | Okazaki et al. | 386/68 |

FOREIGN PATENT DOCUMENTS

| | | |
|---|---|---|
| EP | 0729153 A2 | 8/1996 |
| EP | 0817480 A1 | 1/1998 |
| EP | 1003337 A1 | 5/2000 |
| GB | 2308264 A | 6/1997 |
| JP | 7-212768 | 8/1995 |
| JP | 8-163504 | 6/1996 |
| JP | 10-191359 | 7/1998 |
| WO | WO 99/20045 | * 4/1999 |

OTHER PUBLICATIONS

"Skillful Technique of Image Compression"; ELECTRONICS; May 1992; pp., 5–10 (w/partial English translation).

* cited by examiner

Primary Examiner—Thai Tran
Assistant Examiner—Polin Chieu
(74) Attorney, Agent, or Firm—Louis Woo

(57) ABSTRACT

A recording apparatus includes a compressive encoder for compressively encoding an input video signal into compression-resultant data whose amount is variable from frame to frame. A first device operates for measuring an accumulative amount of the compression-resultant data generated by the compressive encoder. A second device operates for generating information of a jump destination position when the accumulative amount measured by the first device reaches a predetermined amount. A third device operates for recording the compression-resultant data generated by the compressive encoder and the jump-destination-position information generated by the second device on a recording medium.

3 Claims, 12 Drawing Sheets

RECORDING APPARATUS WITH JUMP DESTINATION POSITION INFORMATION

BACKGROUND OF THE INVENTION

1. Field of the Invention

This invention relates to an apparatus for recording picture data and jump-destination-position index information for high-speed playback on a recording medium such as an optical disc.

2. Description of the Related Art

In some cases, picture data are recorded on a recording medium such as an optical disc. During high-speed playback of a certain type, picture data on a recording medium are skip-read so that only some of 1-frame-corresponding segments of the picture data are sequentially reproduced on a periodic jump basis. The high-speed playback is used in a search for a desired scene represented by the picture data.

It is known to record picture data and also index information on a recording medium. The index information represents jump destination positions on the recording medium. The index information is used for high-speed playback.

According to a conventional recording system, the frame-measured intervals between separate 1-frame-corresponding segments of picture data which will be sequentially reproduced during high-speed playback are independent of the degree of motion or change in pictures represented by the picture data. Therefore, during high-speed playback of a portion of the picture data which relates to a high degree of picture motion or change, successively reproduced pictures greatly differ from each other in contents. The great differences between the successively reproduced pictures are unsuitable to a search for a desired scene. On the other hand, during high-speed playback of a portion of the picture data which relates to a very low degree of picture motion or change, successively reproduced pictures remain approximately constant in contents. Thus, it takes a long time to find a desired scene.

SUMMARY OF THE INVENTION

It is an object of this invention to provide an improved recording apparatus.

A first aspect of this invention provides a recording apparatus comprising a compressive encoder for compressively encoding an input video signal into compression-resultant data whose amount is variable from frame to frame; first means for measuring an accumulative amount of the compression-resultant data generated by the compressive encoder; second means for generating information of a jump destination position when the accumulative amount measured by the first means reaches a predetermined amount; and third means for recording the compression-resultant data generated by the compressive encoder and the jump-destination-position information generated by the second means on a recording medium.

A second aspect of this invention is based on the first aspect thereof, and provides a recording apparatus further comprising fourth means for counting frames represented by the compression-resultant data; fifth means for generating information of a jump destination position when a number of frames counted by the fourth means reaches a predetermined number; and sixth means for recording the jump-destination-position information generated by the fifth means on the recording medium.

A third aspect of this invention is based on the first aspect thereof, and provides a recording apparatus further comprising fourth means for resetting the accumulative amount measured by the first means when the second means generates the jump-destination-position information.

A fourth aspect of this invention provides a recording apparatus comprising a compressive encoder for compressively encoding an input video signal into compression-resultant data, and generating a signal representing a motion in pictures represented by the compression-resultant data; first means for measuring an accumulative amount of the motion represented by the signal generated by the compressive encoder; second means for generating information of a jump destination position when the accumulative amount measured by the first means reaches a predetermined amount; and third means for recording the compression-resultant data generated by the compressive encoder and the jump-destination-position information generated by the second means on a recording medium.

A fifth aspect of this invention is based on the fourth aspect thereof, and provides a recording apparatus further comprising fourth means for counting frames represented by the compression-resultant data; fifth means for generating information of a jump destination position when a number of frames counted by the fourth means reaches a predetermined number; and sixth means for recording the jump-destination-position information generated by the fifth means on the recording medium.

A sixth aspect of this invention is based on the fourth aspect thereof, and provides a recording apparatus further comprising fourth means for resetting the accumulative amount measured by the first means when the second means generates the jump-destination-position information.

DESCRIPTION OF THE PREFERRED EMBODIMENTS

A prior-art recording disc and a prior-art recording apparatus will be explained hereinafter for a better understanding of this invention.

Figure 1:
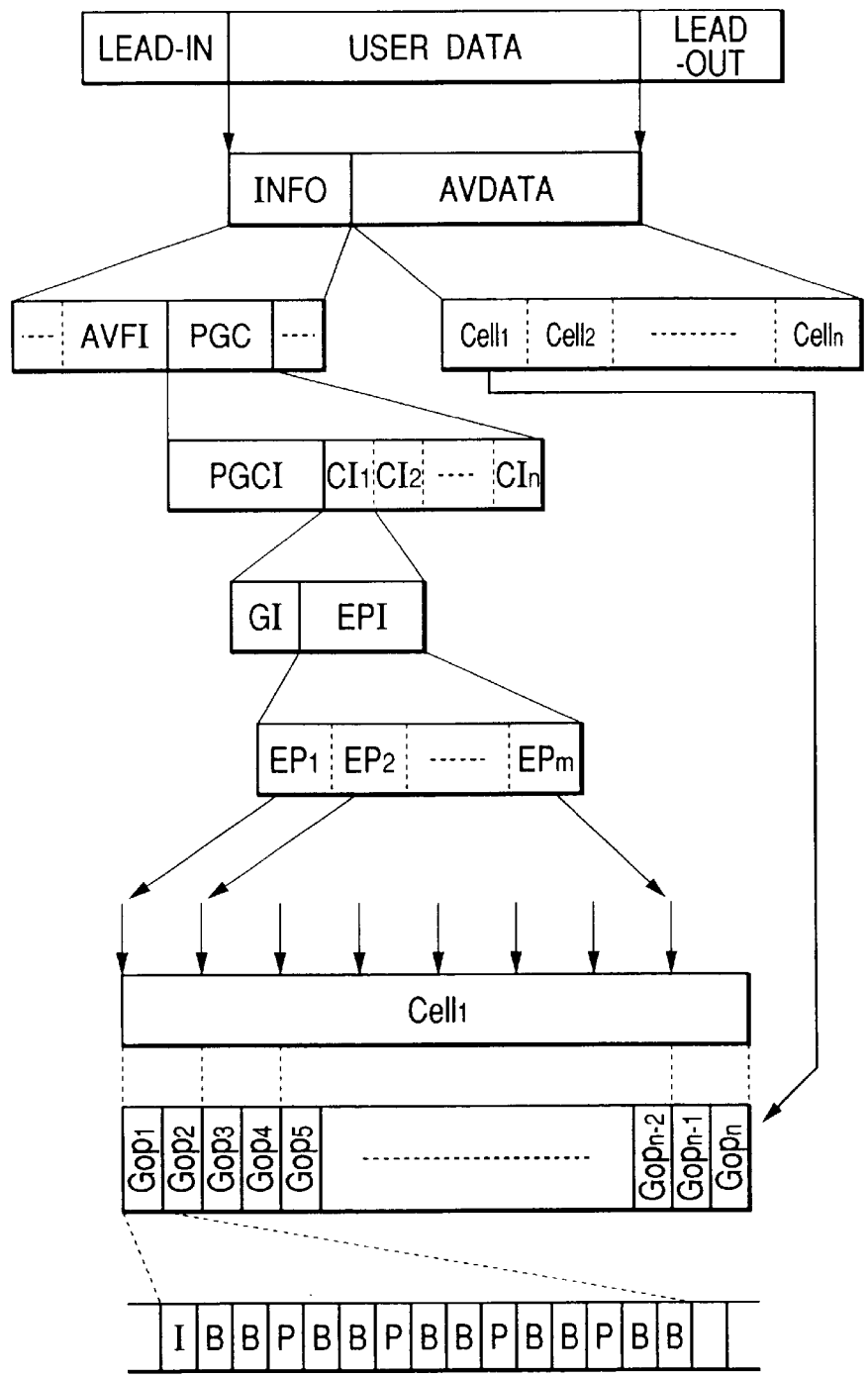
FIG. 1 is a diagram of the structure of a prior-art recording disc.

FIG. 1 shows the structure of a prior-art recording disc having a spiral train of pits representing a recorded signal. The prior-art disc in FIG. 1 has a lead-in area, a user data area (a main data area) and a lead-out area. The lead-in area extends in an inner part of the disc. The lead-out area extends in an outer part of the disc. The user data area extends in an intermediate part of the disc between the lead-in area and the lead-out area. The lead-in area, the user data area, and the lead-out area compose the whole recording area of the disc. The whole recording area is separated into sectors corresponding to data units. Serial numbers (serial sector numbers or serial sector order numbers) are assigned to the sectors respectively. Signals representing the sector numbers are recorded on the disc. The sector number signals are used for detection of a currently-accessed position on the disc during playback.

As shown in FIG. 1, audio-visual data (AV data) and various information pieces are recorded on the user data area. The AV data 5 result from compression of original data. The various information pieces are designed for playback control. The AV data are separated into cells (cell1, cell2, ..., celln) corresponding to respective time intervals or respective scenes being playback units. Each cell is composed of group-of-pictures GOP1, GOP2, ..., GOPn. Each group-of-picture is separated into, for example, 15 data segments representing 15 frames or 15 pictures including an I picture (an intra coded picture), P pictures (predictive coded pictures), and B pictures (bidirectionally predictive coded pictures). A head or a first place in each group-of-picture is occupied by I-picture data.

The various information pieces include an information piece AVFI for expanding the whole AV data, and a program chain information piece PGC for controlling the reproduction of the cells. The program chain information piece PGC is composed of a main program chain information piece PGCI and cell information pieces CI1, CI2, ..., CIn. The main program chain information piece PGCI represents a program playback order. The cell information pieces CI1, CI2, ..., CIn relate to the cells (cell1, cell2, ..., celln), respectively. Each cell information piece has a general information piece GI and a set EPI of entry point information pieces EP1, EP2, ..., EPm. The general information piece GI represents group-of-picture order numbers (group-of-picture ID numbers) and a playback time corresponding to the related cell. The entry point information pieces EP1, EP2, ..., EPm are index information pieces representing jump destination positions which are used for high-speed playback and also for finding the position of a head of a desired part of the AV contents. Specifically, the entry point information pieces EP1, EP2, ..., EPm indicate specified points in the related cell, respectively. In more detail, the entry point information pieces EP1, EP2, ..., EPm indicate the positions of the heads (the I-picture data) of successive group-of-pictures or equally-spaced selected ones of group-of-pictures in the related cell, respectively.

Figure 2:
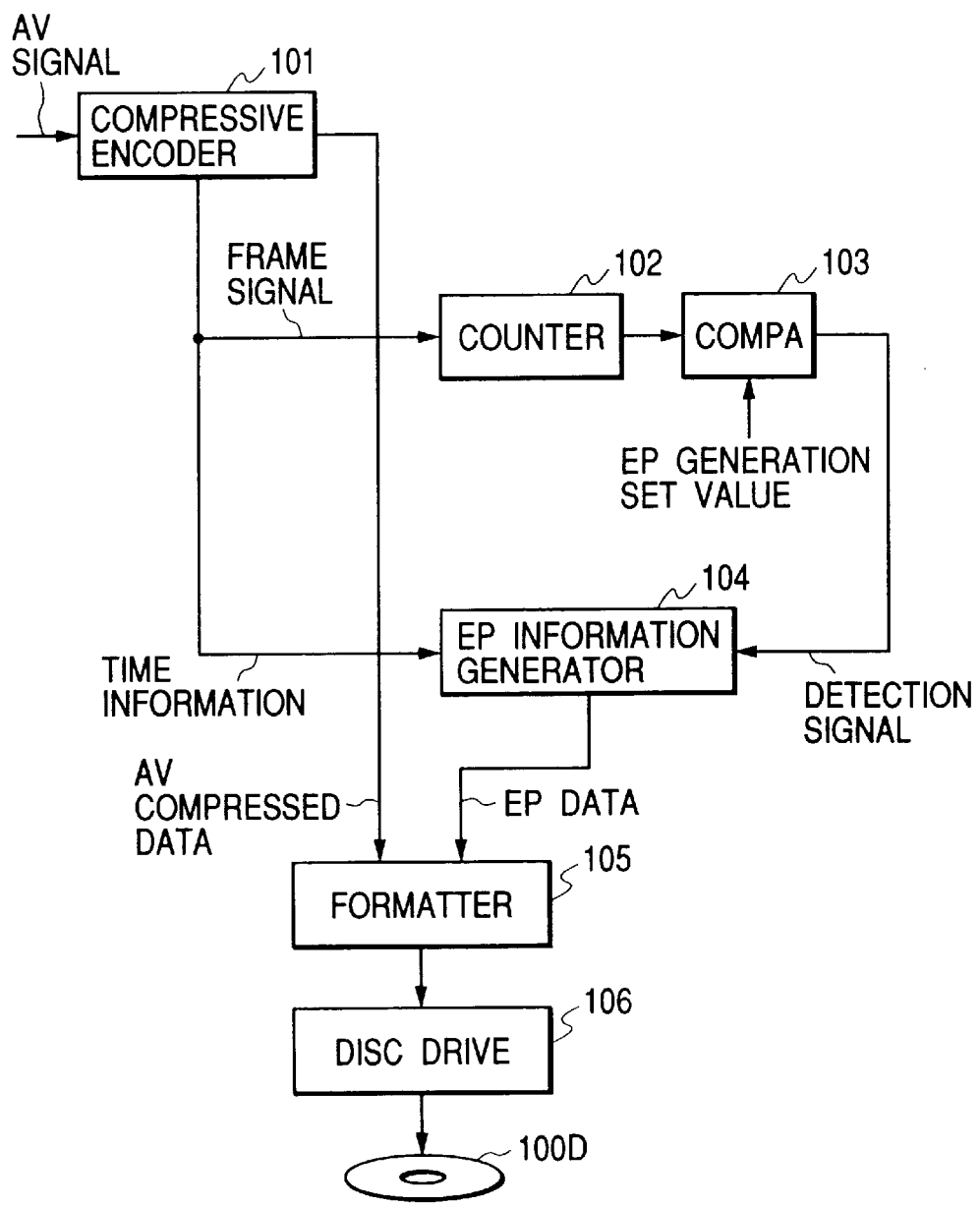
FIG. 2 is a block diagram of a prior-art recording apparatus.

FIG. 2 shows a prior-art recording apparatus. As shown in FIG. 2, the prior-art recording apparatus includes an MPEG encoder 101 receiving an input AV signal. The MPEG encoder 101 compressively encodes the input AV signal into compression-resultant data. The MPEG encoder 101 outputs the compression-resultant data to a formatter 105.

The encoding by the MPEG encoder 101 is periodic on a frame-by-frame basis. Each time the encoding for one frame is completed, the MPEG encoder 101 outputs a 1-frame-corresponding signal to a counter 102 and outputs time information to an EP (entry point) information generator 104. The time information represents time defined with respect to the input AV signal. The counter 102 responds to the 1-frame-corresponding signal, and thereby counts frames related to the compression-resultant data and generates a signal representing the count result, that is, the number of counted frames. The counter 102 outputs the count-result signal to a comparator 103. The comparator 103 receives a signal representing a predetermined setting frame number for EP generation. The setting frame number is equal to, for example, 300 (300 frames) corresponding to a time of 10 seconds, 30 (30 frames) corresponding to a time of 1 second, or 15 (15 frames) corresponding to a time of 0.5 second. The device 103 compares the count-result signal and the setting-frame-number signal with each other, generating a detection signal each time the count frame number represented by the output signal from the counter 102 reaches the setting frame number. The comparator 103 periodically outputs the detection signal to the counter 102 and the EP information generator 104. The counter 102 is reset by every detection signal outputted from the comparator 103.

In the prior-art recording apparatus of FIG. 2, the EP information generator 104 produces EP data in response to the time information outputted from the MPEG encoder 101 and the detection signal outputted from the comparator 103. The EP information generator 104 outputs the generated EP data to the formatter 105.

As previously mentioned, the formatter 105 receives the compression-resultant data from the MPEG encoder 101. The formatter 105 processes and formats the compression-resultant data into AV data of a predetermined format in which the AV data are separated into cells (cell1, cell2, ..., celln) each composed of group-of-pictures GOP1, GOP2, ..., GOPn as shown in FIG. 1. The formatter 105 outputs the AV data to a disc drive 106. The disc drive 106 records the AV data on a recording disc 100D. Specifically, the disc drive 106 adds an error correction code signal to the AV data, and subjects the error-correction-code added AV data to channel modulation for record on the disc 100D. The disc drive 106 records the modulation-resultant signal on the disc 100D.

As previously mentioned, the formatter 105 receives the EP data from the EP information generator 104. The formatter 105 uses the EP data as index information pieces representing jump destination positions respectively and hence representing time positions in the AV data respectively. The index information pieces are entry point information pieces EP1, EP2, ..., EPm (see FIG. 1). The formatter 105 generates other information pieces. The formatter 105 outputs the index information pieces and the other information pieces to the disc drive 106. The index information pieces and the other information pieces are various information pieces for playback control. After the recording of the AV data has been completed, the disc drive 106 records the index information pieces and the other information pieces on the recording disc 100D. Specifically, the disc drive 106 adds an error correction code signal to the index information pieces and the other information pieces, and subjects the error-correction-code added information pieces to channel modulation for record on the disc 100D. The disc drive 106 records the modulation-resultant signal on the disc 100D.

Figure 3:
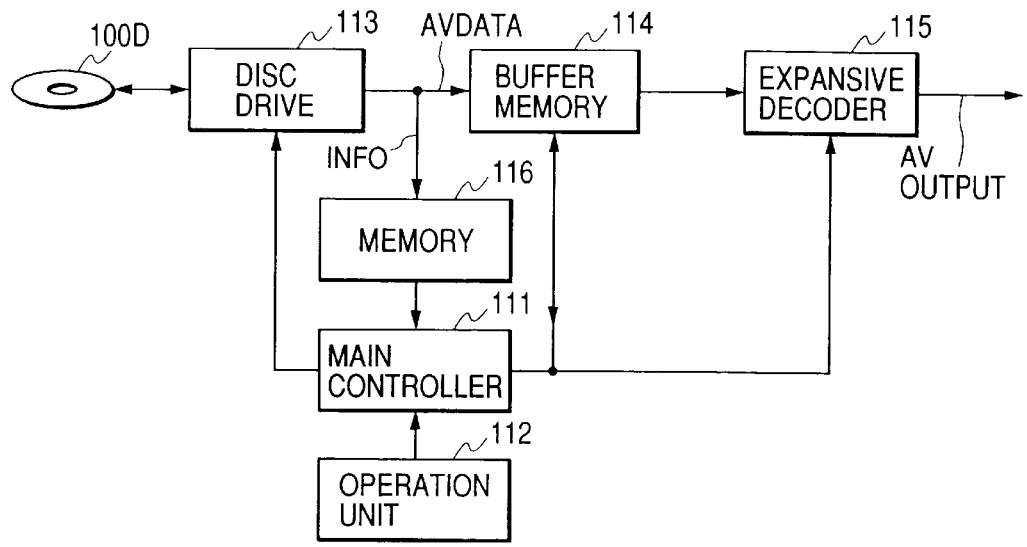
FIG. 3 is a block diagram of a prior-art disc player.

FIG. 3 shows a prior-art disc player which includes a main controller 111, an operation unit 112, a disc drive 113, a buffer memory 114, an MPEG decoder 115, and a memory 116. The operation unit 112 can be actuated by a user. The operation unit 112 outputs various command signals to the main controller 111 in accordance with user's requirements.

The disc drive 113 is controlled by the main controller 111, accessing a recording disc 100D and reproducing a signal therefrom. The disc drive 113 outputs the reproduced signal to the buffer memory 114 and the memory 116. The main controller 111 controls the memory 116 so that various information pieces in the reproduced signal will be written into the memory 116. The main controller 111 responds to the various information pieces in the memory 116. The main controller 111 controls the buffer memory 114 so that AV data in the reproduced signal will be written into the buffer memory 114. The buffer memory 114 outputs the AV data to the MPEG decoder 115. The MPEG decoder 115 is controlled by the main controller 111, expansively decoding the AV data into an original AV signal referred to as a reproduced AV signal or a recovered AV signal. The MPEG decoder 115 outputs the reproduced AV signal.

Figure 4:
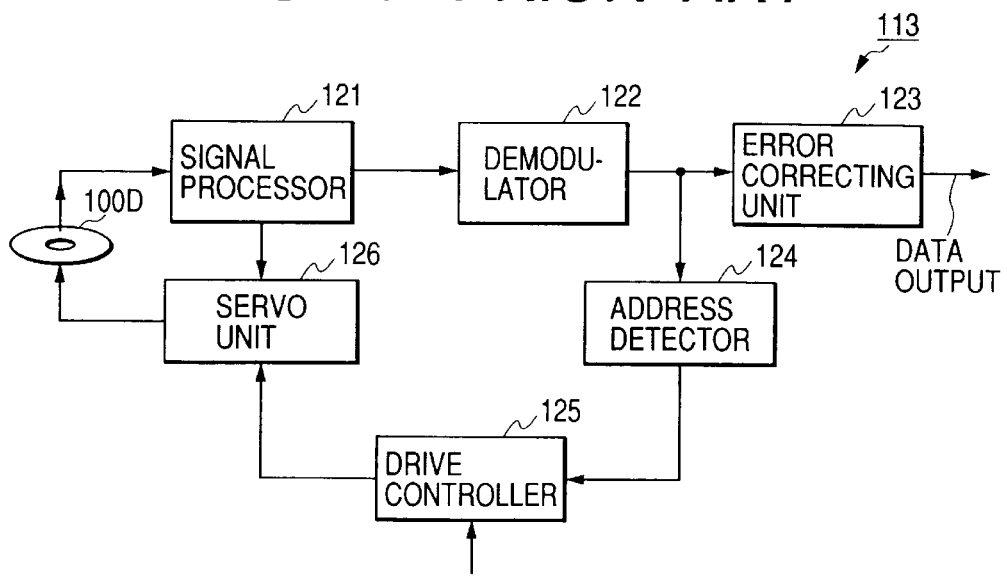
FIG. 4 is a block diagram of a disc drive in FIG. 3.

As shown in FIG. 4, the disc drive 113 includes a signal processor 121, a demodulator 122, an error correcting unit 123, an address detector 124, a drive controller 125, and a servo unit 126. The drive controller 125 responds to an address signal outputted from the address detector 124 and a control signal outputted from the main controller 111 (see FIG. 3). The servo unit 126 is controlled by the drive controller 125 and responds to a control signal outputted from the signal processor 121, thereby controlling a position on the recording disc 100D which is currently accessed by a head (not shown). The head scans the recording disc 100D and reads out a signal therefrom, and outputs the read-out signal to the signal processor 121. The signal processor 121 processes the read-out signal. The signal processor 121 outputs the processing resultant signal to the demodulator 122. In addition, the signal processor 121 generates the control signal in response to the read-out signal. The signal processor 121 outputs the control signal to the servo unit 126. The demodulator 122 demodulates the output signal of the signal processor 121 into data. The demodulator 122 outputs the data to the error correcting unit 123 and the address detector 124. The error correcting unit 123 corrects errors in the output data from the demodulator 122 in response to an error correction code signal therein. The error correcting unit 123 outputs the correction-resultant data to the buffer memory 114 and the memory 116 as the reproduced signal. The address detector 124 detects address information in the output data from the demodulator 122. The address detector 124 outputs the detected address information to the drive controller 125 as the address signal.

The prior-art disc player in FIG. 3 operates as follows. During a preliminary process preceding normal-speed continuous playback, the main controller 111 controls the disc drive 113 to read out various information pieces for playback control from a specified place in the recording disc 100D. The read-out various information pieces are outputted from the disc drive 113 to the memory 116. The main controller 111 controls the memory 116 so that the various information pieces are stored into the memory 116. The various information pieces in the memory 116 contain an information piece AVFI for expanding the whole AV data. The main controller 111 reads out the information piece AVFI from the memory 116, and sets the information piece AVFI in the MPEG decoder 115.

The various information pieces in the memory 116 contain a main program chain information piece PGCI representing a program playback order. Also, the various information pieces in the memory 116 contain cell information pieces CI1, CI2, . . . , CIn. When the operation unit 112 is actuated by the user so that a normal-playback-starting command signal is outputted from the operation unit 112 to the main controller 111, normal-speed continuous playback is started as follows. The main controller 111 refers to the main program chain information piece PGCI and the cell information pieces CI1, CI2, . . . , CIn in the memory 116 in response to the normal-playback-starting command signal. The main controller 111 controls the disc drive 113 according to the main program chain information piece PGCI and group-of-picture order numbers represented by the cell information pieces CI1, CI2, . . . , CIn to sequentially read out group-of-pictures (AV data) on a cell-by-cell basis. The read-out group-of-pictures, that is, the AV data, are outputted from the disc drive 113 to the buffer memory 114. The main controller 111 controls the buffer memory 114 so that the AV data are stored into the buffer memory 114. The main controller 111 monitors the amount of the AV data currently stored in the buffer memory 114. When the monitored amount of the AV data in the buffer memory 114 exceeds a predetermined reference level, the main controller 111 starts and activates the MPEG decoder 115 and transfers the AV data from the buffer memory 114 to the MPEG decoder 115. The MPEG decoder 115 expansively decodes the AV data into an original AV signal (a reproduced AV signal or a recovered AV signal). The MPEG decoder 115 outputs the reproduced AV signal.

The preliminary process may be followed by high-speed playback (skip playback). Each of the cell information pieces CI1, CI2, . . . , CIn in the memory 116 has entry point information pieces EP1, EP2, , EPm which indicate the positions of the heads (the I-picture data) of successive group-of-pictures or equally-spaced selected ones of group-of-pictures in the related cell, respectively. When the operation unit 112 is actuated by the user so that a skip-playback-starting command signal is outputted from the operation unit 112 to the main controller 111, high-speed playback (skip playback) is started as follows. The main controller 111 refers to the entry point information pieces EP1, EP2, . . . , EPm in the memory 116 in response to the skip-playback-starting command signal. The main controller 111 controls the disc drive 113 according to the entry point information pieces EP1, EP2, . . . , EPm to sequentially read out the I-picture data in successive group-of-pictures or equally-spaced selected ones of group-of-pictures (AV data) on a periodic jump basis. In this way, the AV data is skip-read. The read-out I-picture data, that is, the portions of the AV data, are outputted from the disc drive 113 to the buffer memory 114. The main controller 111 controls the buffer memory 114 so that the I-picture data are stored into the buffer memory 114. The main controller 111 monitors the amount of the I-picture data currently stored in the buffer memory 114. When the monitored amount of the I-picture data in the buffer memory 114 exceeds a predetermined reference level, the main controller 111 starts and activates the MPEG decoder 115 and transfers the I-picture data from the buffer memory 114 to the MPEG decoder 115. The MPEG decoder 115 expansively decodes the I-picture data into a high-speed-playback AV signal. The MPEG decoder 115 outputs the high-speed-playback AV signal.

In general, the encoding by the MPEG encoder 101 is of such a type that the amount of encoding-resultant data for one frame is variable. Therefore, the compression-resultant data outputted from the MPEG encoder 101 is variable in amount for one frame. The encoding by the MPEG encoder 101 includes quantization using a variable quantization scale.

Figure 5:
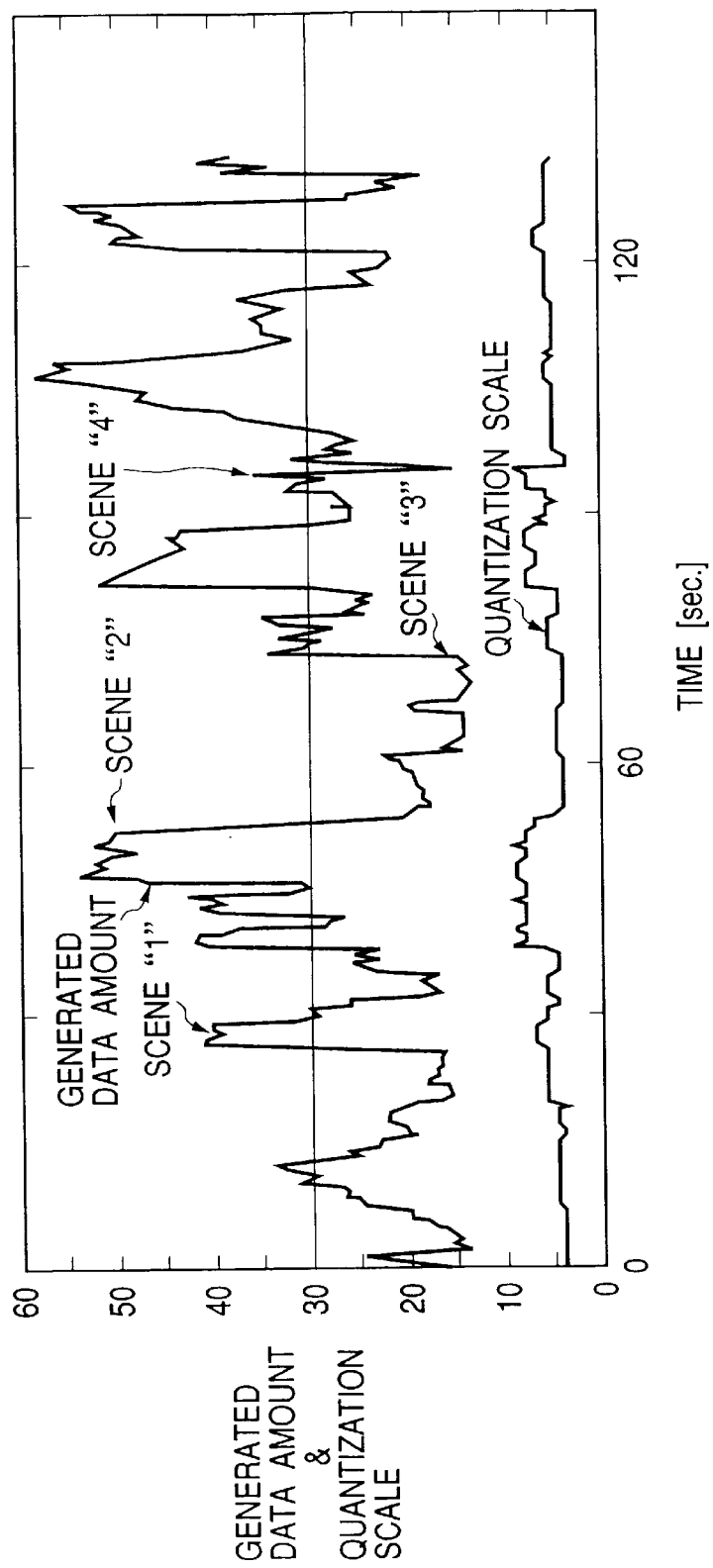
FIG. 5 is a time-domain diagram of an example of a generated code data amount and a quantization scale in the prior-art recording apparatus of FIG. 2.

FIG. 5 shows an example of variations in the amount of the compression-resultant data outputted from the MPEG encoder 101 for one frame, and variations in the quantization scale used in the MPEG encoder 101. As shown in FIG. 5, the generated-data amount is great for hard-moving scenes or changing scenes "1" and "2". On the other hand, the generated-data amount is small for slightly-moving scenes or substantially-still scenes "3" and "4".

Figure 6:
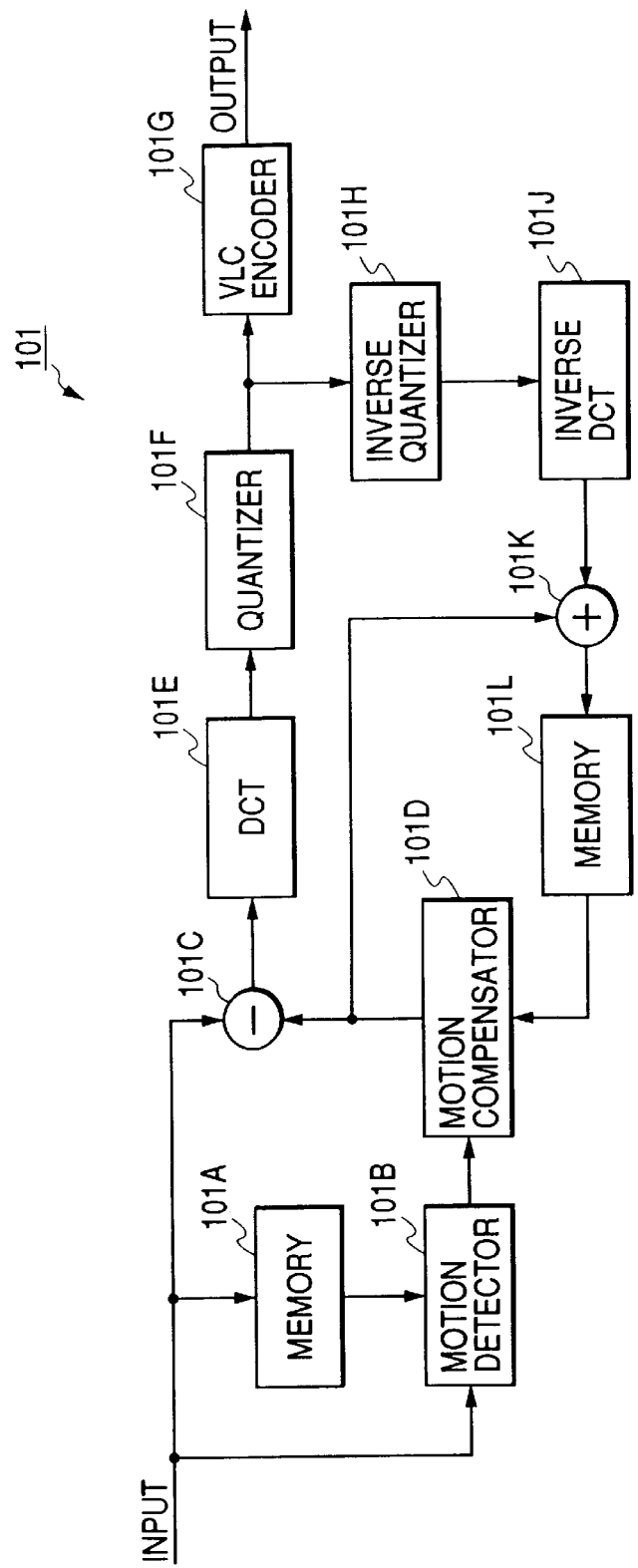
FIG. 6 is a functional block diagram of an MPEG encoder in FIG. 2.

FIG. 6 shows the details of the MPEG encoder 101. As shown in FIG. 6, the MPEG encoder 101 includes a memory 101A, a motion detector 101B, and a subtracter 101C to which input picture data are applied as current-frame picture data. The input picture data are stored into the memory 101A before being fed therefrom to the motion detector 101B as preceding-frame picture data. The motion detector 101B divides each of the current frame and the preceding frame into blocks, and detects motion vectors through a block-by-block matching process. The motion detector 101B outputs a signal representative of the motion vectors to a motion compensator 101D.

The motion compensator 101D outputs motion-compensated predicted picture data to the subtracter 101C. The subtracter 101C calculates a difference or an error between the input picture data and the motion-compensated predicted picture data, and generates difference picture data or error picture data representing the calculated difference or error. The subtracter 101C outputs the difference picture data (the error picture data) to a DCT device 101E.

The DCT device 101E subjects the difference picture data to discrete cosine transform (DCT) which is a kind of orthogonal transform. The DCT device 101E generates DCT-resultant picture data representing DCT coefficients. The DCT device 101E outputs the DCT-coefficient data to a quantizer 101F. The device 101F quantizes the DCT-coefficient data in response to a variable quantization scale which is controlled depending on, for example, the amount of generated code data. The quantizer 101F outputs the quantization-resultant picture data to a variable length encoder 101G and an inverse quantizer 101H.

The variable length encoder 101G converts the quantization-resultant picture data into a sequence of corresponding words of a variable length code (VLC), for example, a Huffman code. The variable length encoder 101G outputs the sequence of VLC words to the formatter 105 (see FIG. 2) as the compression-resultant data, that is, the MPEG-encoding-resultant data.

The inverse quantizer 101H subjects the quantization-resultant picture data to inverse quantization, thereby returning the quantization-resultant picture data to the DCT-coefficient data. The inverse quantizer 101H outputs the DCT-coefficient data to an inverse DCT device 101J. The inverse DCT device 101J subjects the DCT-coefficient data to inverse DCT, thereby returning the DCT-coefficient data to the difference picture data (the error picture data). The inverse DCT device 101J outputs the difference picture data to an adder 101K. The adder 101K receives the motion-compensated predicted picture data from the motion compensator 101D. The adder 101K combines the difference picture data and the motion-compensated predicted picture data into data representing a reference picture for motion-compensated prediction. The adder 101K stores the reference picture data into a memory 101L. The memory 101L feeds the reference picture data to the motion compensator 101D. The motion compensator 101D implements motion compensation responsive to the reference picture data and the motion vectors notified by the motion detector 101B. The motion compensator 101D generates the motion-compensated predicted picture data in response to the reference picture data and the motion vectors. The motion compensator 101D outputs the motion-compensated predicted picture data to the subtracter 101C and the adder 101K.

During high-speed playback to search for a desired scene, the following problem tends to occur. As previously mentioned, during high-speed playback, the I-picture-representing segments of the AV data are sequentially reproduced in response to the entry point information pieces EP1, EP2, . . . , EPm. The frame-measured intervals between the I-picture-representing segments of the AV data are fixed independently of the degree of motion or change in pictures represented by the AV data. Therefore, during high-speed playback of a portion of the AV data which relates to a high degree of picture motion or change, successively reproduced I pictures greatly differ from each other in contents. The great differences between the successively reproduced I pictures are unsuitable to a search for a desired scene. On the other hand, during high-speed playback of a portion of the AV data which relates to a very low degree of picture motion or change, successively I reproduced pictures remain approximately constant in contents. Thus, it takes a long time to find a desired scene.

First Embodiment

Figure 7:
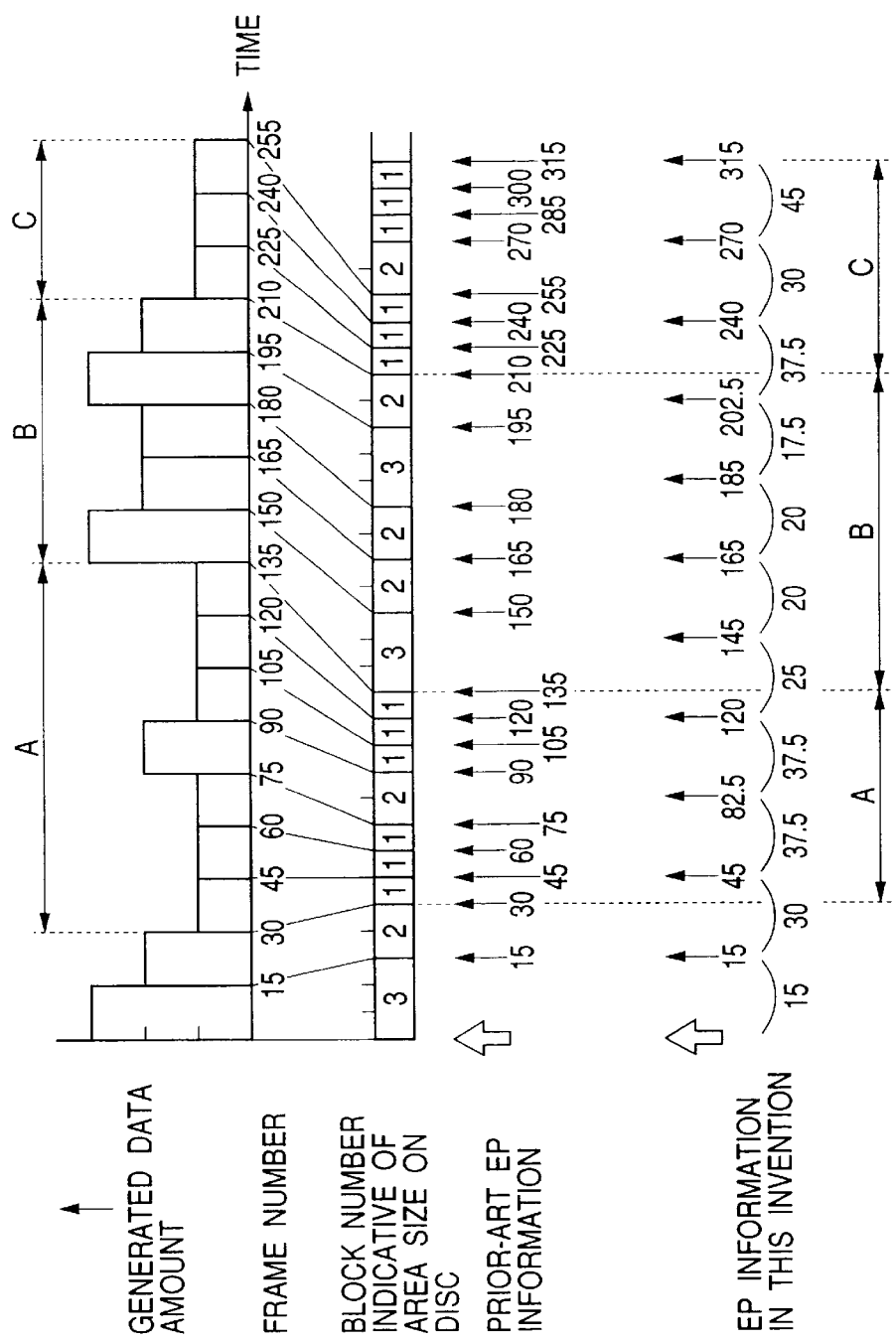
FIG. 7 is a time-domain diagram of a generated code data amount, a frame order number, a block number indicative of an area size on a recording disc, prior-art EP information, and EP information in this invention.

FIG. 7 shows an example of variations in the amount of generated data (compression-resultant data or MPEG-encoding-resultant data) for one group-of-picture corresponding to 15 frames. During a time interval "A" having a 31st frame to a 135th frame, the amount of generated data for one group-of-picture remains below an average level since the generated data represent slightly-moving pictures or substantially-still pictures. During a time interval "B" following the time interval "A" and having a 136th frame to a 210th frame, the amount of generated data for one group-of-picture remains above the average level since the generated data represent hard-moving pictures or changing pictures. During a time interval "C" following the time interval "B" and having a 211th frame to a 255th frame, the amount of generated data for one group-of-picture remains below the average level since the generated data represent slightly-moving pictures or substantially-still pictures.

As shown in FIG. 7, each group-of-picture occupies one or more blocks on a recording disc in accordance with the amount of data therein. Specifically, a group-of-picture having a small amount of data is assigned to only one block on the recording disc. A group-of-pictures having an intermediate amount of data is assigned to two blocks on the recording disc. A group-of-picture having a great amount of data is assigned to three blocks on the recording disc. During the time intervals "A" and "C" for which the amount of generated data is small, most of group-of-pictures are of the one-block type. On the other hand, during the time interval "B" for which the amount of generated data is great, most of group-of-pictures are of the two-block type or the three-block type.

As shown in FIG. 7, entry point information pieces generated in the prior-art recording apparatus of FIG. 2 indicate the positions of the heads of group-of-pictures which are spaced at 15-frame intervals. Since the amount of MPEG-encoding-resultant data varies from group-of-picture to group-of-picture, the intervals between the positions indicated by the prior-art entry point information pieces are not fixed in terms of MPEG-encoding-resultant data amount (in terms of MPEG-encoding-resultant bit stream). Great amounts of generated data are assigned to hard-moving pictures and changing pictures while small amounts of generated data are assigned to slightly-moving pictures and substantially-still pictures. Thus, in terms of MPEG-encoding-resultant data amount, the positions indicated by the prior-art entry point information pieces are coarsely distributed in the time interval "B" which corresponds to hard-moving pictures and changing pictures. On the other hand, the positions indicated by the prior-art entry point information pieces are densely distributed in the time intervals "A" and "C" which correspond to slightly-moving pictures and substantially-still pictures.

As shown in FIG. 7, in a first embodiment of this invention, an entry point information piece is generated for every predetermined amount of compression-resultant data (MPEG-encoding-resultant data). Entry point information pieces generated in the first embodiment of this invention indicate jump destination positions which do not have any immediate connection with time information concerning a before-encoding AV signal. Thus, in the first embodiment of this invention, the intervals between the positions indicated by the entry point information pieces are fixed in terms of MPEG-encoding-resultant data amount (in terms of MPEG-encoding-resultant bit stream).

Figure 8:
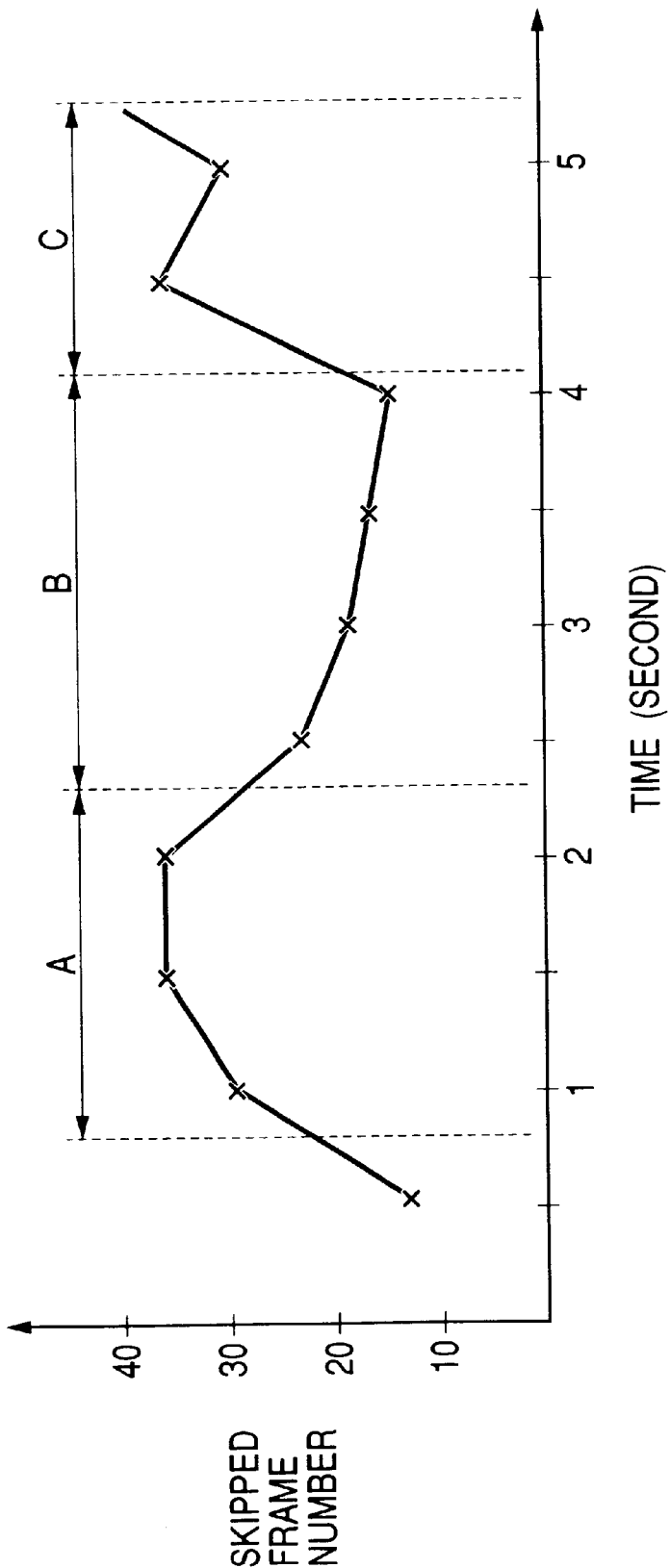
FIG. 8 is a time-domain diagram of the number of skipped frames.

FIG. 8 shows variations in number of skipped frames for one jump during high-speed playback (skip playback) of the MPEG-encoding-resultant data in FIG. 7 according to the first embodiment of this invention. As shown in FIG. 8, during the time intervals "A" and "C" corresponding to slightly-moving pictures and substantially-still pictures, the number of skipped frames for one jump remains great (above 30) since the slightly-moving pictures and the substantially-still pictures are assigned to small amounts of MPEG-encoding-resultant data. Thus, it is possible to quickly find a desired scene. As shown in FIG. 8, during the time interval "B" corresponding to hard-moving pictures and changing pictures, the number of skipped frames for one jump remains small (below 20) since the hard-moving pictures and the changing pictures are assigned to great amounts of MPEG-encoding-resultant data. Thus, it is easy to find a desired scene.

Figure 9:
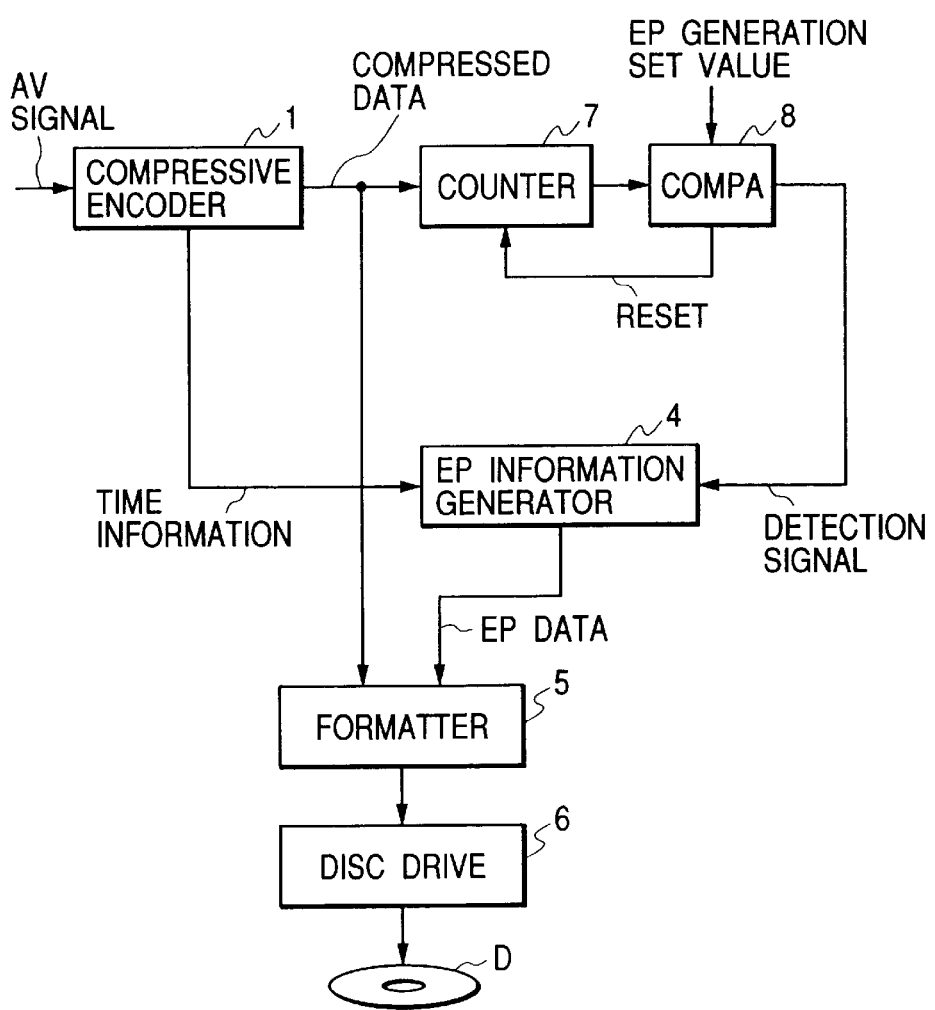
FIG. 9 is a block diagram of a recording apparatus according to a first embodiment of this invention.

FIG. 9 shows a recording apparatus according to the first embodiment of this invention. The recording apparatus of FIG. 9 includes a highly-efficient compressive encoder 1 receiving an input AV signal. The compressive encoder 1 is of a conventional type. For example, the compressive encoder 1 is an MPEG encoder. The compressive encoder 1 may differ from an MPEG encoder. The compressive encoder 1 compressively encodes the input AV signal into compression-resultant data in the form of a bit stream. The compressive encoder 1 outputs the compression-resultant data to a formatter 5 and a counter 7.

The encoding by the compressive encoder 1 is periodic on a frame-by-frame basis. Each time the encoding for one frame is completed, the compressive encoder 1 outputs time information to an EP (entry point) information generator 4. The time information represents time defined with respect to the input AV signal.

The device 7 counts every bit in the compression-resultant data. As will be made clear later, the counter 7 is periodically reset. The counter 7 measures the amount (the number of bits) of the compression-resultant data which occur after the counter 7 is reset. The counter 7 generates a signal representing the measured amount of the compression-resultant data. The counter 7 outputs the measured-data-amount signal to a comparator 8. The comparator 8 receives a signal from a suitable device (not shown) which represents a predetermined reference data amount or a predetermined setting data amount for EP generation. The setting data amount corresponds to, for example, three blocks (see FIG. 7) on a recording disc. The device 8 compares the measured-data-amount signal and the setting-data-amount signal with each other, generating a detection signal and a reset signal each time the measured data amount represented by the output signal from the counter 7 reaches the setting data amount. The comparator 8 periodically outputs the detection signal to the EP information generator 4. The comparator 8 periodically outputs the reset signal to the counter 7. The counter 7 is reset in response to every reset signal outputted from the comparator 8. The detection signal may be used as the reset signal.

The EP information generator 4 produces EP data in response to the time information outputted from the compressive encoder 1 and the detection signal outputted from the comparator 8. The EP information generator 4 outputs the generated EP data to the formatter 5.

As previously mentioned, the formatter 5 receives the compression-resultant data from the compressive encoder 1. The formatter 5 processes and formats the compression-resultant data into AV data of a predetermined format in which the AV data are separated into cells (cell1, cell2, . . . , celln) each composed of group-of-pictures GOP1, GOP2, . . . , GOPn as shown in FIG. 1. The formatter 5 outputs the AV data to a disc drive 6. The disc drive 6 records the AV data on a recording disc "D" such as an optical disc, a DVD, a CD, a magneto-optical disc, or a magnetic disc. Specifically, the disc drive 6 adds an error correction code signal to the AV data, and subjects the error-correction-code added AV data to channel modulation for record on the disc "D". The disc drive 6 records the modulation-resultant signal on the disc "D".

As previously mentioned, the formatter 5 receives the EP data from the EP information generator 4. The formatter 5 uses the EP data as index information pieces representing jump destination positions respectively and hence representing time positions in the AV data respectively. The index information pieces are entry point information pieces representing positions spaced at intervals which are not fixed in terms of frames but are fixed in terms of compression-resultant data (encoding-resultant data). The formatter 5 generates other information pieces. The formatter 5 outputs the index information pieces and the other information pieces to the disc drive 6. The index information pieces and the other information pieces are various information pieces for playback control. After the recording of the AV data has been completed, the disc drive 6 records the index information pieces and the other information pieces on the recording disc "D". Specifically, the disc drive 6 adds an error correction code signal to the index information pieces and the other information pieces, and subjects the error-correction-code added information pieces to channel modulation for record on the disc "D". The disc drive 6 records the modulation-resultant signal on the disc "D".

Figure 10:
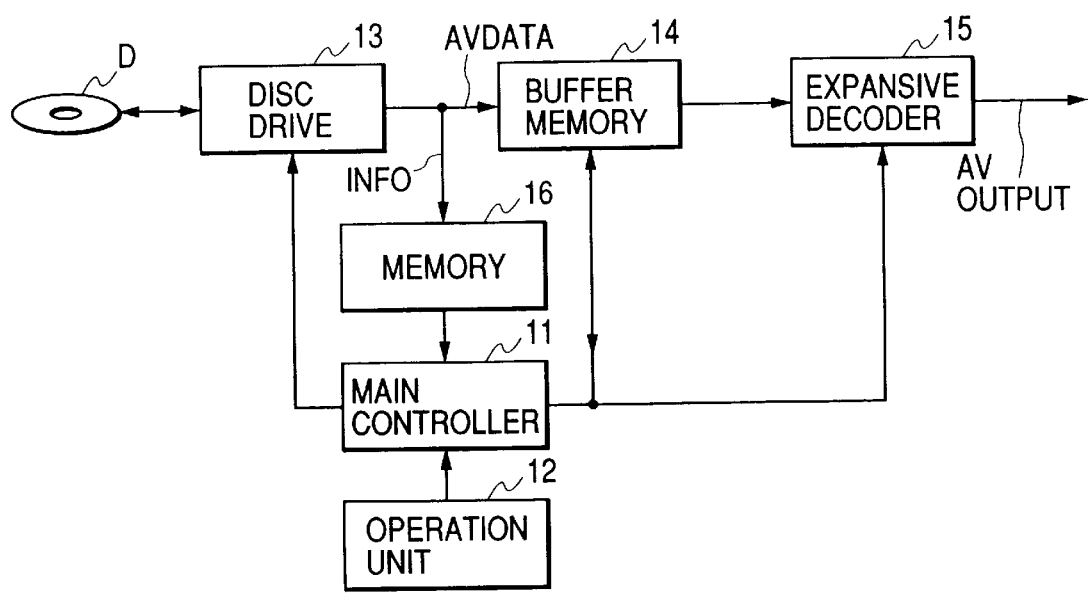
FIG. 10 is a block diagram of a disc player according to the first embodiment of this invention.

FIG. 10 shows a disc player according to the first embodiment of this invention. The disc player of FIG. 10 includes a main controller 11, an operation unit 12, a disc drive 13, a buffer memory 14, an expansive decoder 15, and a memory 16. The main controller 11 includes a microcomputer or a CPU which operates in accordance with a control program stored in an internal ROM. The control program is designed to enable the main controller 11 to implement processes mentioned later. The disc drive 13 is of a conventional type. The expansive decoder 15 is of a conventional type. An example of the expansive decoder 15 is an MPEG decoder. The expansive decoder 15 may differ from an MPEG encoder. The operation unit 12 can be actuated by a user. The operation unit 12 outputs various command signals to the main controller 11 in accordance with user's requirements. The disc drive 13 is controlled by the main controller 11, accessing a recording disc "D" and reproducing a signal therefrom. The disc drive 13 outputs the reproduced signal to the buffer memory 14 and the memory 16. The main controller 11 controls the memory 16 so that various information pieces in the reproduced signal will be written into the memory 16. The main controller 11 responds to the various information pieces in the memory 16. The main controller 11 controls the buffer memory 14 so that AV data in the reproduced signal will be written into the buffer memory 14. The buffer memory 14 outputs the AV data to the expansive decoder 15. The expansive decoder 15 is controlled by the main controller 11, expansively decoding the AV data into an original AV signal referred to as a reproduced AV signal or a recovered AV signal. The expansive decoder 15 outputs the reproduced AV signal.

The disc player in FIG. 10 operates as follows. During a preliminary process preceding normal-speed continuous playback, the main controller 11 controls the disc drive 13 to read out various information pieces for playback control from a specified place in the recording disc "D". The read-out various information pieces are outputted from the disc drive 13 to the memory 16. The main controller 11 controls the memory 16 so that the various information pieces are stored into the memory 16. The various information pieces in the memory 16 contain an information piece AVFI for expanding the whole AV data. The main controller 11 reads out the information piece AVFI from the memory 16, and sets the information piece AVFI in the expansive decoder 15.

The various information pieces in the memory 16 contain a main program chain information piece PGCI representing a program playback order. Also, the various information pieces in the memory 16 contain cell information pieces CI1, CI2, ..., CIn. When the operation unit 12 is actuated by the user so that a normal-playback-starting command signal is outputted from the operation unit 12 to the main controller 11, normal-speed continuous playback is started as follows. The main controller 11 refers to the main program chain information piece PGCI and the cell information pieces CI1, CI2, ..., CIn in the memory 16 in response to the normal-playback-starting command signal. The main controller 11 controls the disc drive 13 according to the main program chain information piece PGCI and group-of-picture order numbers represented by the cell information pieces CI1, CI2, ..., CIn to sequentially read out group-of-pictures (AV data) on a cell-by-cell basis. The read-out group-ofpictures, that is, the AV data, are outputted from the disc drive 13 to the buffer memory 14. The main controller 11 controls the buffer memory 14 so that the AV data are stored into the buffer memory 14. The main controller 11 monitors the amount of the AV data currently stored in the buffer memory 14. When the monitored amount of the AV data in the buffer memory 14 exceeds a predetermined reference level, the main controller 11 starts and activates the expansive decoder 15 and transfers the AV data from the buffer memory 14 to the expansive decoder 15. The expansive decoder 15 expansively decodes the AV data into an original AV signal (a reproduced AV signal or a recovered AV signal). The MPEG decoder 15 outputs the reproduced AV signal.

The preliminary process may be followed by high-speed playback (skip playback). Each of the cell information pieces CI1, CI2, ..., CIn in the memory 16 has entry point information pieces which indicate the jump destination positions in the related cell, respectively. When the operation unit 12 is actuated by the user so that a skip-playback-starting command signal is outputted from the operation unit 12 to the main controller 11, high-speed playback (skip playback) is started as follows. The main controller 11 refers to the entry point information pieces in the memory 16 in response to the skip-playback-starting command signal. The main controller 11 controls the disc drive 13 according to the entry point information pieces to sequentially read out, on a periodic jump basis, I-picture data among the AV data which are designated by the entry point information pieces. Specifically, when the position indicated by an entry point information piece is equal to an I-picture data position, the present I-picture data are read out. On the other hand, when the position indicated by an entry point information piece differs from any I-picture data positions, I-picture data in a position immediately following the position represented by the entry point information piece are read out. In this way, the AV data is skip-read. The read-out I-picture data, that is, the portions of the AV data, are outputted from the disc drive 13 to the buffer memory 14. The main controller 11 controls the buffer memory 14 so that the I-picture data are stored into the buffer memory 14. The main controller 11 monitors the amount of the I-picture data currently stored in the buffer memory 14. When the monitored amount of the I-picture data in the buffer memory 14 exceeds a predetermined reference level, the main controller 11 starts and activates the expansive decoder 15 and transfers the I-picture data from the buffer memory 14 to the expansive decoder 15. The expansive decoder 15 expansively decodes the I-picture data into a high-speed-playback AV signal. The expansive decoder 15 outputs the high-speed-playback AV signal.

Second Embodiment

A second embodiment of this invention is similar to the first embodiment thereof except for design changes mentioned hereinafter.

Figure 11:
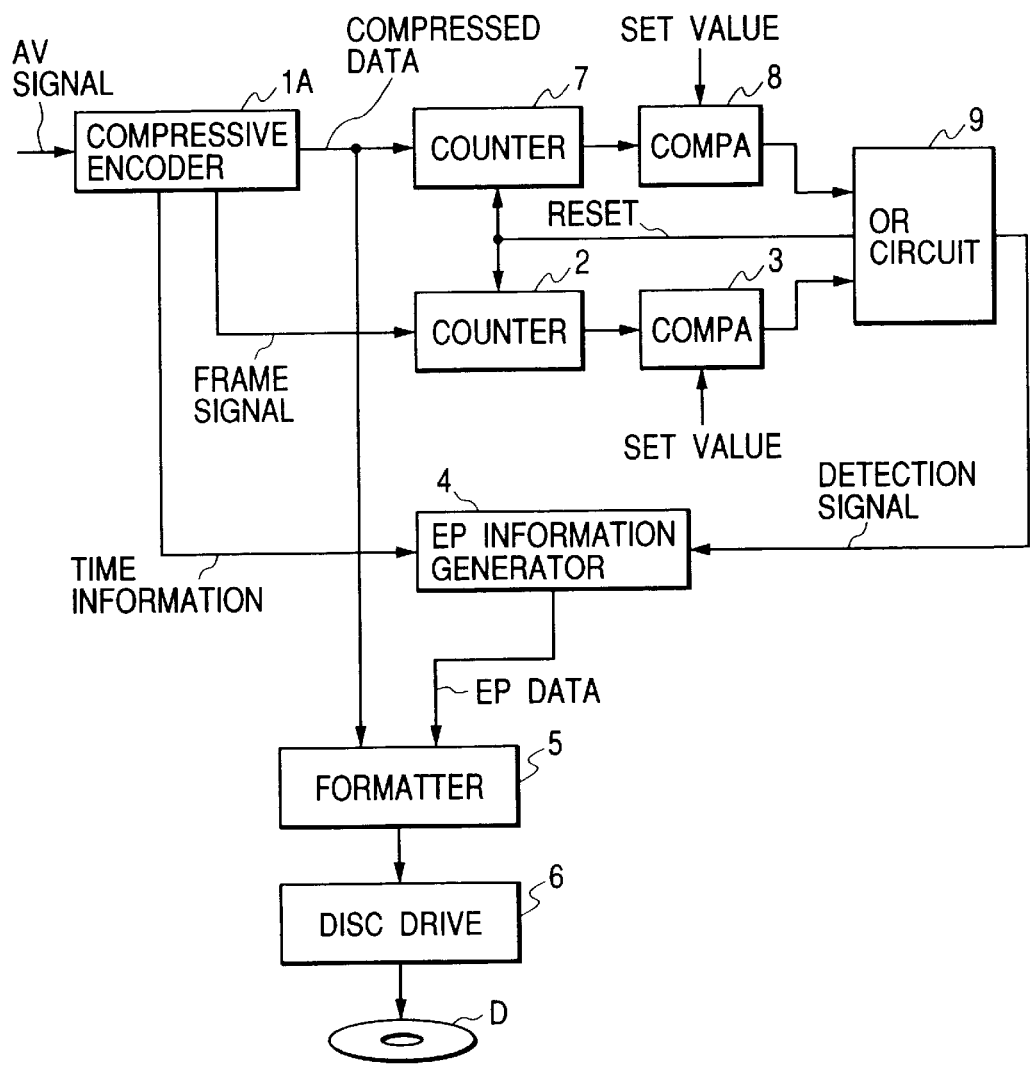
FIG. 11 is a block diagram of a recording apparatus according to a second embodiment of this invention.

FIG. 11 shows a recording apparatus according to the second embodiment of this invention. The recording apparatus of FIG. 11 includes a highly-efficient compressive encoder 1A instead of the highly-efficient compressive encoder 1 (see FIG. 9). The recording apparatus of FIG. 11 also includes a counter 2, a comparator 3, and an OR circuit 9.

The compressive encoder 1A is of a conventional type. For example, the compressive encoder 1A is an MPEG encoder. The compressive encoder 1A may differ from an MPEG encoder. The encoding by the compressive encoder 1A is periodic on a frame-by-frame basis. Each time the encoding for one frame is completed, the compressive encoder 1A outputs a 1-frame-corresponding signal to the counter 2.

The counter 2 responds to the 1-frame-corresponding signal, and thereby counts frames related to compression-resultant data outputted from the compressive encoder 1A. The counter 2 generates a signal representing the count result, that is, the number of counted frames. The counter 2 outputs the count-result signal to the comparator 3. The comparator 3 receives a signal from a suitable device (not shown) which represents a predetermined setting frame number for EP generation. The setting frame number is equal to, for example, 30 (30 frames) corresponding to a time of 1 second. The device 3 compares the count-result signal and the setting-frame-number signal with each other, generating a detection signal each time the count frame number represented by the output signal from the counter 2 reaches the setting frame number. The comparator 3 periodically outputs the detection signal to the OR circuit 9. The detection signal passes through the OR circuit 9 before reaching an EP information generator 4.

A comparator 8 periodically outputs a detection signal to the OR circuit 9. The detection signal passes through the OR circuit 9 before reaching the EP information generator 4.

Every detection signal outputted from the OR circuit 9 is fed to the counters 2 and 7 as a reset signal. The counters 2 and 7 are reset in response to every reset signal fed from the OR circuit 9.

The detection signals outputted from the counter 3 provide an upper limit of the frame-measured intervals between positions represented by entry point information pieces. Specifically, the upper limit of the frame-measured intervals corresponds to, for example, 30 frames.

Third Embodiment

A third embodiment of this invention is similar to the first embodiment thereof except for design changes mentioned hereinafter.

Figure 12:
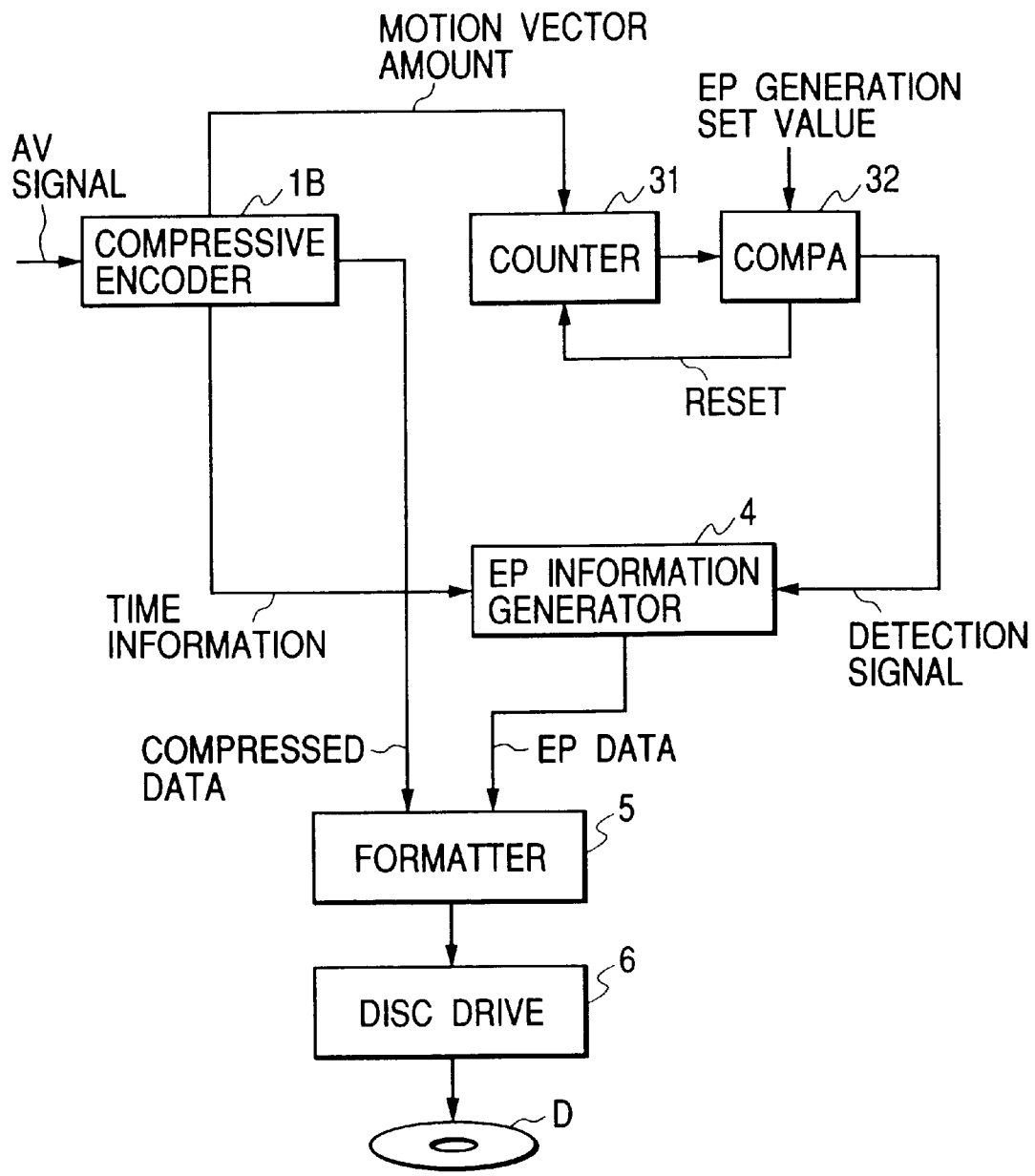
FIG. 12 is a block diagram of a recording apparatus according to a third embodiment of this invention.

FIG. 12 shows a recording apparatus according to the third embodiment of this invention. The recording apparatus of FIG. 11 includes a highly-efficient compressive encoder 1B instead of the highly-efficient compressive encoder 1 (see FIG. 9). The recording apparatus of FIG. 11 also includes a counter 31 and a comparator 32 instead of the counter 7 and the comparator 8 (see FIG. 9).

The compressive encoder 1B is of a conventional type. For example, the compressive encoder 1B is an MPEG encoder. The compressive encoder 1B may differ from an MPEG encoder. The encoding by the compressive encoder 1B is periodic on a frame-by-frame basis. During the encoding for every frame, the compressive encoder 1B outputs a signal of the quantities or magnitudes of motion vectors to the counter 31.

The device 31 counts bits of the output signal from the compressive encoder 1B to detect the accumulative quantity or magnitude of the motion vectors. The counter 31 generates a signal representing the count result, that is, the count number. The counter 31 outputs the count-result signal to the comparator 32. The comparator 32 receives a signal from a suitable device (not shown) which represents a predetermined setting count number for EP generation. The device 32 compares the count-result signal and the setting-count-number signal with each other, generating a detection signal and a reset signal each time the count number represented by the output signal from the counter 31 reaches the setting count number. The comparator 32 periodically outputs the detection signal to an EP information generator 4. The comparator 32 periodically outputs the reset signal to the counter 31. The counter 31 is reset in response to every reset signal outputted from the comparator 31. The detection signal may be used as the reset signal.

As understood from the previous explanation, in the third embodiment of this invention, the intervals between the positions indicated by entry point information pieces are fixed in terms of motion-vector quantity.

Fourth Embodiment

A fourth embodiment of this invention is similar to the third embodiment thereof except for design changes mentioned hereinafter.

Figure 13:
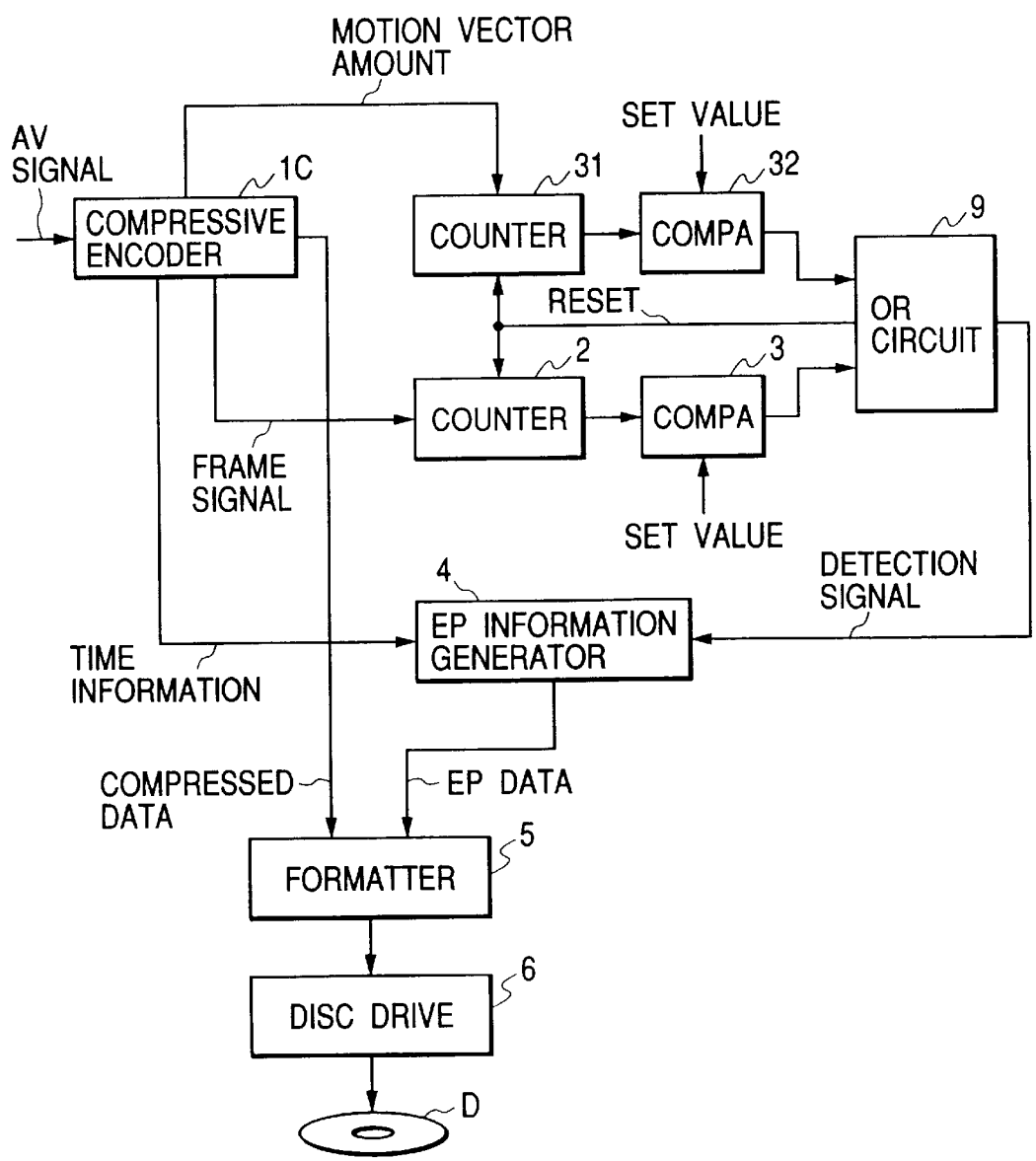
FIG. 13 is a block diagram of a recording apparatus according to a fourth embodiment of this invention.

FIG. 13 shows a recording apparatus according to the fourth embodiment of this invention. The recording apparatus of FIG. 13 includes a highly-efficient compressive encoder 1C instead of the highly-efficient compressive encoder 1B (see FIG. 12). The recording apparatus of FIG. 13 also includes a counter 2, a comparator 3, and an OR circuit 9.

The compressive encoder 1C is of a conventional type. For example, the compressive encoder 1C is an MPEG encoder. The compressive encoder 1C may differ from an MPEG encoder. The encoding by the compressive encoder 1B is periodic on a frame-by-frame basis. Each time the encoding for one frame is completed, the compressive encoder 1C outputs a 1-frame-corresponding signal to the counter 2.

The counter 2 responds to the 1-frame-corresponding signal, and thereby counts frames related to compression-resultant data outputted from the compressive encoder 1C. The counter 2 generates a signal representing the count result, that is, the number of counted frames. The counter 2 outputs the count-result signal to the comparator 3. The comparator 3 receives a signal from a suitable device (not shown) which represents a predetermined setting frame number for EP generation. The setting frame number is equal to, for example, 30 (30 frames) corresponding to a time of 1 second. The device 3 compares the count-result signal and the setting-frame-number signal with each other, generating a detection signal each time the count frame number represented by the output signal from the counter 2 reaches the setting frame number. The comparator 3 periodically outputs the detection signal to the OR circuit 9. The detection signal passes through the OR circuit 9 before reaching an EP information generator 4.

A comparator 32 periodically outputs a detection signal to the OR circuit 9. The detection signal passes through the OR circuit 9 before reaching the EP information generator 4.

Every detection signal outputted from the OR circuit 9 is fed to the counters 2 and 31 as a reset signal. The counters 2 and 31 are reset in response to every reset signal fed from the OR circuit 9.

The detection signals outputted from the comparator 3 provide an upper limit of the frame-measured intervals between positions represented by entry point information pieces. Specifically, the upper limit of the frame-measured intervals corresponds to, for example, 30 frames.

Fifth Embodiment

A fifth embodiment of this invention is similar to the third or fourth embodiment thereof except that the counter 31 responds to data representing the difference between frames.

Sixth Embodiment

A sixth embodiment of this invention is similar to the third or fourth embodiment thereof except that one of a compressive VBR (variable bit rate) encoder and a compressive CBR (constant bit rate) encoder replaces the compressive encoder 1B or 1C.

Seventh Embodiment

A seventh embodiment of this invention is similar to one of the first to fourth embodiments thereof except that prior-art EP information is recorded on a recording disc in addition to the EP information generated by the EP information generator 4. In this case, a disc player uses one of the prior-art EP information and the EP information generated by the EP information generator 4 in accordance with use's requirement. Alternatively, the disc player may use both the prior-art EP information and the EP information generated by the EP information generator 4.

What is claimed is:

1. A recording apparatus comprising:

a compressive encoder for compressively encoding an input video signal into compression-resultant data, and generating a signal representing a motion in pictures represented by the compression-resultant data;

first means for measuring an accumulative amount of motion represented by the signal generated by the compressive encoder;

second means for generating information of a jump destination position when the accumulative amount measured by the first means reaches a predetermined amount; and third means for recording the compression-resultant data generated by the compressive encoder and the jump-destination-position information generated by the second means on a recording medium.

2. A recording apparatus as recited in claim 1, further comprising:

fourth means for counting frames represented by the compression-resultant data;

fifth means for generating information of a jump destination position when a number of frames counted by the fourth means reaches a predetermined number; and sixth means for recording the jump-destination-position information generated by the fifth means on the recording medium.

3. A recording apparatus as recited in claim 1, further comprising fourth means for resetting the accumulative amount measured by the first means when the second means generates the jump-destination-position information.

* * * * *